(12) United States Patent
Huang

(10) Patent No.: US 8,434,923 B2
(45) Date of Patent: May 7, 2013

(54) LED BACKLIGHT MODULE

(75) Inventor: Yung-Lun Huang, Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 315 days.

(21) Appl. No.: 12/913,790

(22) Filed: Oct. 28, 2010

(65) Prior Publication Data

US 2011/0292678 A1 Dec. 1, 2011

(30) Foreign Application Priority Data

May 27, 2010 (TW) .................................. 99116986

(51) Int. Cl.
*F21V 8/00* (2006.01)

(52) U.S. Cl.
USPC ........... 362/612; 362/615; 362/623; 362/625; 362/626; 362/606

(58) Field of Classification Search ................. 362/612, 362/615, 623, 625, 626
See application file for complete search history.

(56) References Cited

U.S. PATENT DOCUMENTS

| 5,134,549 | A * | 7/1992 | Yokoyama | 362/623 |
| 5,390,436 | A * | 2/1995 | Ashall | 40/546 |
| 6,522,373 | B1 * | 2/2003 | Hira et al. | 362/603 |
| 6,991,359 | B2 * | 1/2006 | Leu et al. | 362/624 |
| 7,325,958 | B2 * | 2/2008 | Yang et al. | 362/621 |
| 7,490,970 | B2 * | 2/2009 | Liao | 362/624 |
| 7,824,092 | B2 * | 11/2010 | Yang et al. | 362/623 |
| 8,047,698 | B2 * | 11/2011 | Zhang et al. | 362/615 |
| 2006/0139957 | A1 * | 6/2006 | Liao | 362/615 |

* cited by examiner

*Primary Examiner* — Stephen F Husar
*Assistant Examiner* — James Cranson, Jr.
(74) *Attorney, Agent, or Firm* — Altis Law Group, Inc.

(57) ABSTRACT

An LED backlight module includes at least one LED and a light guide plate. The light guide plate includes a light incident surface, a light emitting surface connected to the light incident surface, and a bottom surface parallel to the light emitting surface. The at least one LED is placed on the light incident surface and spaced at regular intervals. The light from the at least one LED enters the light guide plate from the light incident surface and is reflected to the light emitting surface by the bottom surface. The light guide plate defines a plurality of concave dots on the bottom surface. The bottom surface is divided into a plurality of discontinuous dot zones. In the dot zone closest to the incident surface, proximity of the dot to the LED decreases the depth and the distribution density of the dots.

6 Claims, 2 Drawing Sheets

LED BACKLIGHT MODULE

BACKGROUND

1. Technical Field

The present disclosure generally relates to LED technology, and particularly to an LED backlight module.

2. Description of the Related Art

Light emitting diodes (LEDs) have many advantages, such as high luminosity, low operational voltage, low power consumption, compatibility with integrated circuits, easy driving, long-term reliability, and environmental friendliness. All of these reasons have promoted the LEDs as a widely used light source. Light emitting diodes are commonly applied in lighting applications.

LED backlight modules must overcome illumination uniformity challenges. An LED backlight module is commonly arranged with a light guide plate and a plurality of LEDs at the periphery of the light guide plate. The illumination of LED in the light guide plate is not uniform. This will affect the performance of the LED backlight module.

What is needed, therefore, is an LED backlight module, which can improve illumination uniformity, and ameliorate the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the LED backlight module. Moreover, in the drawings, like reference numerals designate corresponding parts throughout the views.

DETAILED DESCRIPTION

Embodiments of an LED backlight module as disclosed are described in detail here with reference to the drawings.

Figure 1:
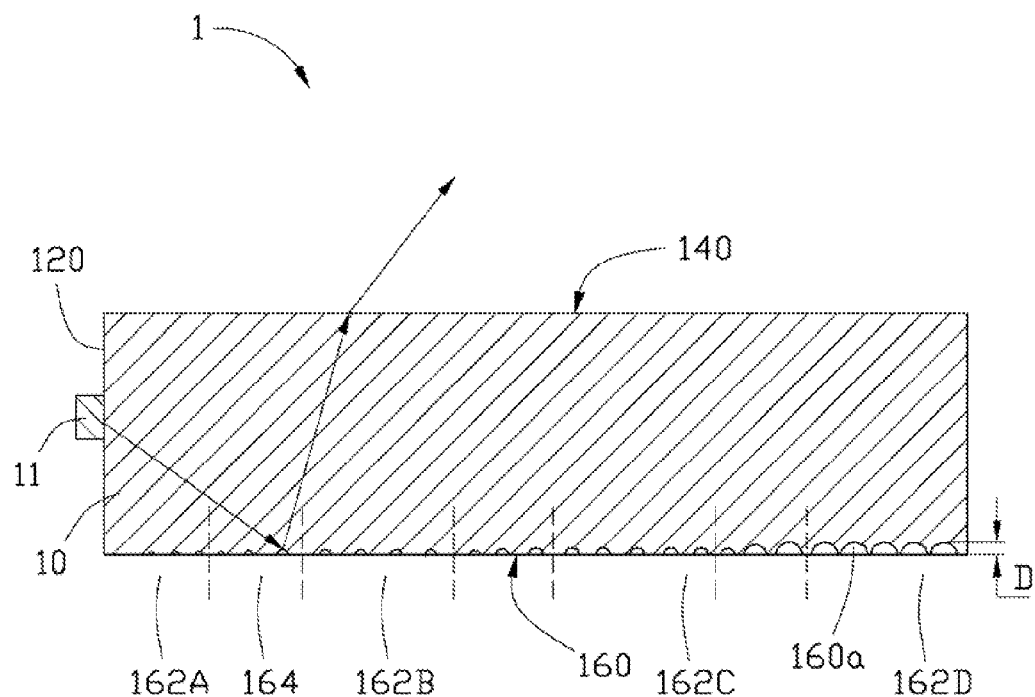
FIG. 1 is a schematic view of an LED backlight module in accordance with a first embodiment.
Figure 2:
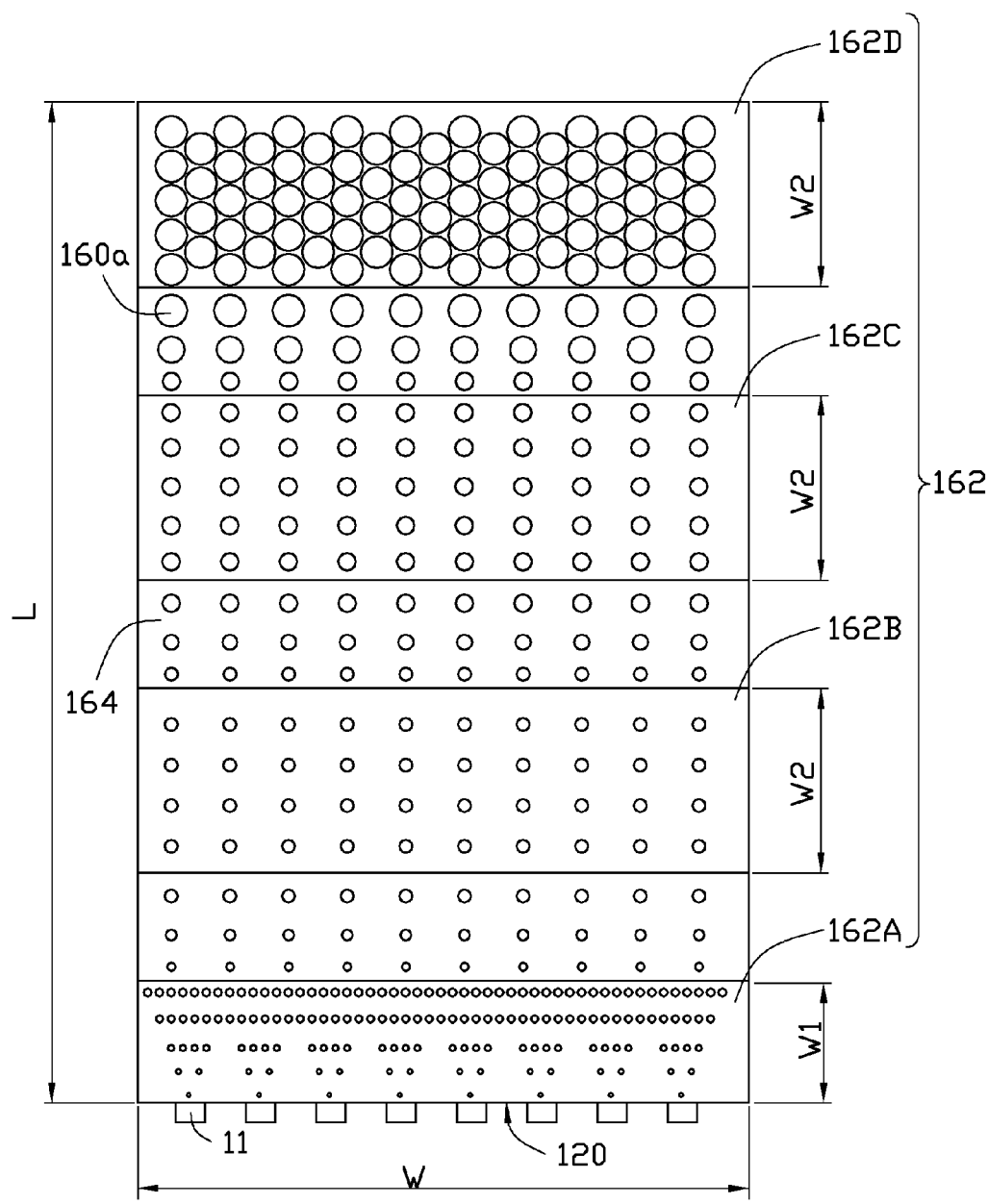
FIG. 2 is a schematic view of dot pattern distribution on the bottom surface of a light guide plate of FIG. 1.

Referring to FIG. 1 and FIG. 2, an LED backlight module 1 in accordance with a first embodiment includes a light guide plate 10 and at least one LED 11 arranged at one side of the periphery of the light guide plate 10. The light guide plate 10 includes a light incident surface 120, a light emitting surface 140, and a bottom surface 160.

In this embodiment, the light incident surface 120 is connected to the light emitting surface 140, and the bottom surface 160 is parallel to the light emitting surface 140 and connected with the light incident surface 120. The at least one LED 11 is arranged on the light incident surface 120 to allow light from the at least one LED 11 into the light guide plate 10 through the light incident surface 120 and then be reflected by the bottom surface 160 to be emitted through the light emitting surface 140.

The light guide plate 10 is a rectangular slab and can also be high transparent material, such as resin, epoxy, silicone, polycarbonate (PC), noryl, polybutylene terephthalate (PBT), polyphthalamide (PPA), polypropylene (PP), polymethyl methacrylate (PMMA), glass fiber, $TiO_2$, $CaCO_3$, or a combination thereof. The at least one LED 11 can be arranged in array and spaced at regular intervals on the light incident surface 120.

The bottom surface 160 defines a plurality of concave dots 160a, each comprising a circular depression. The depth D of each concave dot 160a is the vertical distance from the farthest point of the concave dot 160a to the bottom surface 160. In this embodiment, the bottom surface 160 sequentially defines four discontinuous dot zones 162A, 162B, 162C, and 162D away from the light incident surface 120.

Other than in dot zone 162A, the closest dot zone to the light incident surface 120, the concave dots 160a in each of dot zones 162B, 162C, and 162D are arranged in an array, and the depth D and the distribution density of the concave dots 160a in the same dot zone 162B, 162C, and 162D perpendicular to the light incident surface 120 are the same The depths D and the distribution densities of the concave dots 160a in the different dot zones 162B, 162C, and 162D are different, The depth and the distribution density of the concave dots 160a in each one of the dot zones 162B and 162C nearer the light incident surface 120 exceed those in another of the dot zones 162C and 162D farther from the light incident surface 120.

A light mixing area 164 is defined between every two adjacent dot zones 162, namely the dot zones 162A and 162B, 162B and 162C, and 162C and 162D The depth D of the concave dots 160a becomes gradually larger in a direction away from light incident surface 120 in each light mixing area 164.

In the dot zone 162A, the closest dot zone to the light incident surface 120, the depth D and distribution density of the concave dots 160a nearer the at least one LED 11 is smaller, and the depth D and distribution density of the concave dots 160a farther from the at least one LED 11 is larger.

For example, as shown in FIG. 2, the length L of the bottom surface 160 is 220 mm, and the width W of the bottom surface 160 is 130 mm. The bottom surface 160 defines sequentially the four dot zones 162A, 16213, 162C, and 162D with a length of 130 mm away from the light incident surface 120. The width W1 of the dot zone 162A is 30 mm, and the width W2 of the dot zones 162B, 162C, and 162D is 45 mm, The depth D of the concave dots 160a in the dot zone 162B is 2.5 µm. The depth D of the concave dots 160a in the dot zone 162C is 3.3 µm. The depth D of the concave dots 160a in the dot zone 162D is 3.5 µm. The dot zone 162A is the closest, to the light incident surface 120, and the depth D and distribution density of the concave dots 160a in the dot zone 162A are proportional to the distance from the at least one LED 11 and are in a range from 2 µm to 2.5 µm.

With the depth D of any concave dot 160a is increased, more light is reflected to be emitted from the light emitting surface 140. The design of the depth D of each concave dot 160a proportional to the distance from the at least one LED 11 will eliminate the hot spot on the light emitting surface 140 on the side near the light source and the dark lane on the light emitting surface 140 on the side away from the light source.

The design of the depth D of the concave dots 160a in each light mixing area 164 increasing gradually from the dot zone of smaller depth D to the dot zone of larger depth D will mix thoroughly light reflected from different dot zones and increase enormously the illumination uniformity of the light guide plate 10.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED backlight module comprising at least one LED and a light guide plate including a light incident surface, a light emitting surface connected to the light incident surface, and a bottom surface parallel to the light emitting surface, wherein the at least one LED is placed on the light incident surface, the light from the at least one LED emits into the light guide plate from the light incident surface and is reflected to the light emitting surface by the bottom surface, the light guide plate defines a plurality of concave dots on the bottom surface, the bottom surface is divided into a plurality of discontinuous dot zones, and in the dot zone closest to the light incident surface, the closer the dots are to the at least one LED, the lesser a depth of the dots and the lower a distribution density of the dots.

2. The LED backlight module of claim 1, wherein the dots in other dot zones beside the dot zone closet to the light incident surface are arranged in an array, the dots in any same dot zone in the other dot zones have the same distribution density and depth, and the dots in one of the other dot zones farther from the light incident surface have a larger distribution density than those in another of the other dot zones closer to the light incident surface.

3. The LED backlight module of claim 2, wherein the dots in the other dot zones beside the dot zone closet to the light incident surface are greater in depth with farther distance from the light incident surface.

4. The LED backlight module of claim 3, wherein the number of dot zones is four, and the depths of the dots in the dot zone second closest to the light incident surface, the dot zone second farthest from the light incident surface, and the dot zone farthest from the light incident surface are 2.5 µm, 3.3 µm and 3.5 µm, respectively.

5. The LED backlight module of claim 4, wherein the depth of the dots in the dot zone closest to the light incident surface are proportional to the distance from the at least one LED, and are in a range from 2 µm to 2.5 µm.

6. The LED backlight module of claim 2, wherein a light mixing area is defined between every two adjacent dot zones, and the depth of dots in each light mixing area becomes gradually larger in a direction away from the light incident surface.

* * * * *